United States Patent
Xu et al.

(10) Patent No.: US 9,413,222 B2
(45) Date of Patent: Aug. 9, 2016

(54) UNDERVOLTAGE PROTECTION CIRCUIT, UNDERVOLTAGE PROTECTION METHOD AND SWITCHING POWER SUPPLY

(71) Applicant: Silergy Semiconductor Technology (Hangzhou) LTD, Hangzhou, ZheJiang Province (CN)

(72) Inventors: Xiaoru Xu, Hangzhou (CN); Yunlong Han, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 175 days.

(21) Appl. No.: 14/186,132

(22) Filed: Feb. 21, 2014

(65) Prior Publication Data

US 2014/0286058 A1    Sep. 25, 2014

(30) Foreign Application Priority Data

Mar. 25, 2013  (CN) .......................... 2013 1 0097865

(51) Int. Cl.
*H02M 3/335*  (2006.01)
*H02M 1/00*  (2006.01)
*H02M 1/32*  (2007.01)

(52) U.S. Cl.
CPC ............ *H02M 1/32* (2013.01); *H02M 3/33523* (2013.01); *H02M 2001/0025* (2013.01)

(58) Field of Classification Search
CPC .............. H02M 1/32; H02M 3/33523; H02M 2001/0025
USPC .......... 363/21.17, 21.08, 21.16, 21.07, 56.05, 363/56.11
See application file for complete search history.

(56) References Cited

U.S. PATENT DOCUMENTS

| | | | | |
|---|---|---|---|---|
| 8,531,853 | B2* | 9/2013 | Baurle | H02M 3/156 363/21.18 |
| 8,619,437 | B2* | 12/2013 | Hachiya | B60L 11/1812 363/20 |
| 2005/0248965 | A1* | 11/2005 | Yamada | H02M 3/33523 363/21.08 |
| 2007/0194724 | A1* | 8/2007 | Ishii | H02M 7/53871 315/291 |
| 2008/0043008 | A1* | 2/2008 | Wang | H05B 33/0815 345/211 |
| 2008/0180973 | A1* | 7/2008 | Park | H02M 3/33523 363/21.01 |
| 2010/0091420 | A1* | 4/2010 | Tsai | H02H 7/1213 361/90 |
| 2012/0159207 | A1* | 6/2012 | Chao | G06F 1/3275 713/310 |
| 2013/0223108 | A1 | 8/2013 | Xu | |
| 2013/0250629 | A1 | 9/2013 | Xu | |

FOREIGN PATENT DOCUMENTS

| | | |
|---|---|---|
| CN | 10399492 A | 4/2009 |
| CN | 201210216958.5 | 10/2012 |
| CN | 201210233135.3 | 10/2012 |

* cited by examiner

*Primary Examiner* — Jessica Han
*Assistant Examiner* — Bart Iliya
(74) *Attorney, Agent, or Firm* — Michael C. Stephens, Jr.

(57) ABSTRACT

In one embodiment, an undervoltage protection circuit for a switching power supply can include: (i) an undervoltage detection circuit that determines whether an input voltage of the switching power supply is in an undervoltage state; (ii) a selection circuit configured to select a first or a second control signal to be provided as a main control signal to a control circuit; (iii) the control circuit being configured, in response to the main control signal being the first control signal, to control a switching operation of a power transistor in the switching power supply such that an output voltage of the switching power supply is maintained as substantially stable; and (iv) the control circuit being configured, in response to the main control signal being the second control signal, to control the switching operation of the power transistor to reduce an input power of the switching power supply.

11 Claims, 7 Drawing Sheets

UNDERVOLTAGE PROTECTION CIRCUIT, UNDERVOLTAGE PROTECTION METHOD AND SWITCHING POWER SUPPLY

RELATED APPLICATIONS

This application claims the benefit of Chinese Patent Application No. 201310097865.X, filed on Mar. 25, 2013, which is incorporated herein by reference in its entirety.

FIELD OF THE INVENTION

The present invention relates to the field of power supplies, and more particularly to an undervoltage protection circuit and method applied in a switching power supply.

BACKGROUND

Switch mode power supplies can efficiently convert electrical power from a source to a load, or to several different loads, with each corresponding to a different output. The main transistor of a switching-mode supply can switch between on and off states at a given operating frequency, and voltage regulation can be achieved by varying the ratio of the on-to-off time of the main transistor. Switch mode power supplies may have relatively high power conversion efficiency, as compared to other types of power converters. Switch mode power supplies may also be substantially smaller and lighter than a linear supply due to the smaller transformer size and weight.

SUMMARY

In one embodiment, an undervoltage protection circuit configured for a switching power supply, can include: (i) an undervoltage detection circuit configured to use a first voltage that represents an input voltage of the switching power supply to determine whether the input voltage is in an undervoltage state, and to output a detection result; (ii) a selection circuit configured to select a first or a second control signal to be provided as a main control signal to a control circuit based on the detection result, where the first control signal comprises an output voltage error feedback signal of the switching power supply, and the second control signal is less than the first control signal; (iii) the control circuit being configured, in response to the main control signal being the first control signal, to control a switching operation of a power transistor in the switching power supply such that an output voltage of the switching power supply is maintained as substantially stable; and (iv) the control circuit being configured, in response to the main control signal being the second control signal, to control the switching operation of the power transistor to reduce an input power of the switching power supply.

In one embodiment, a method of controlling undervoltage protection in a switching power supply, can include: (i) generating a detection result by detecting whether an input voltage of the switching power supply is in an undervoltage state; (ii) selecting, based on the detection result, a first or a second control signal as a main control signal for a control circuit, where the first control signal comprises an output voltage error feedback signal of the switching power supply, and the second control signal is less than the first control signal; (iii) controlling, in response to the main control signal being the first control signal, a switching operation of a power transistor in the switching power supply such that an output voltage of the switching power supply is maintained as substantially stable; and (iv) controlling, in response to the main control signal being the second control signal, the switching operation of the power transistor to reduce an input power of the switching power supply.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In various switching power supply applications, the external power supply network may behave in an abnormal fashion (e.g., a sudden power down, insufficient voltage, etc.) in some cases. As a result, damage can occur on a power device or transistor in the switching power supply. Therefore, in switching power supply design, undervoltage detection and protection of the input voltage of the switching power supply may be addressed.

In one approach, a sense voltage can be obtained via a series-connected voltage dividing resistor loop coupled to an external power network voltage. The sense voltage can change in proportion to the power network voltage, and when the sense voltage is reduced to less than a predetermined voltage, the system may take various protection measures. For example, such protection measures can include disabling the switching power supply or employing a backup battery.

Drawbacks of this approach to undervoltage detection and protection include when the external power supply voltage is relatively high, the dividing resistors for sensing are relatively large, and this may increase power losses as well as overall system product costs.

In one embodiment, an undervoltage protection circuit configured for a switching power supply, can include: (i) an undervoltage detection circuit configured to use a first voltage that represents an input voltage of the switching power supply to determine whether the input voltage is in an undervoltage state, and to output a detection result; (ii) a selection circuit configured to select a first or a second control signal to be provided as a main control signal to a control circuit based on the detection result, where the first control signal comprises an output voltage error feedback signal of the switching power supply, and the second control signal is less than the first control signal; (iii) the control circuit being configured, in response to the main control signal being the first control signal, to control a switching operation of a power transistor in the switching power supply such that an output voltage of the switching power supply is maintained as substantially stable; and (iv) the control circuit being configured, in response to the main control signal being the second control signal, to control the switching operation of the power transistor to reduce an input power of the switching power supply.

Figure 1:
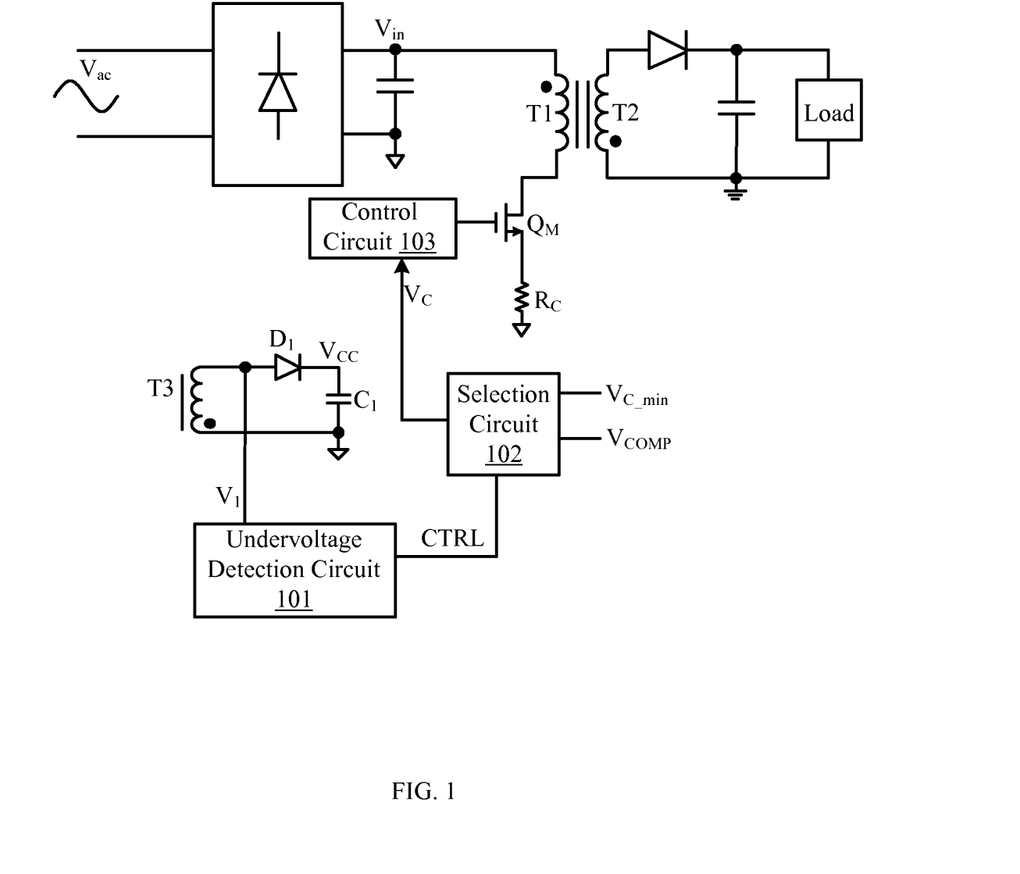
FIG. 1 is a schematic block diagram of a first example undervoltage protection circuit in accordance with embodiments of the present invention.

Referring now to FIG. 1, shown is a schematic block diagram of a first example undervoltage protection circuit in accordance with embodiments of the present invention. In this particular example, the undervoltage protection circuit can be applied in a switching power supply (e.g., a flyback topology). Any suitable converter topology (e.g., forward, boost, buck, SEPIC, ZETA, etc.) can be utilized in particular embodiments. In this example, the flyback topology power stage circuit can include a transformer (including primary winding T1 and secondary winding T2), power transistor $Q_M$, and series-connected sampling resistor $R_C$.

As shown in FIG. 1, the input voltage information detection in this particular example can employ auxiliary inductor T3 that is coupled with an input inductor (e.g., primary winding T1) in the switching power supply, so as to generate voltage $V_1$. Voltage $V_1$ can represent power supply input voltage (e.g., $V_{in}$) information, according to an induced voltage on auxiliary inductor T3. In this way, by not directly using a voltage dividing resistor loop to sample the input voltage, chip pins (e.g., for external chip connections) and power losses for the overall circuit may be reduced.

Figure 2:
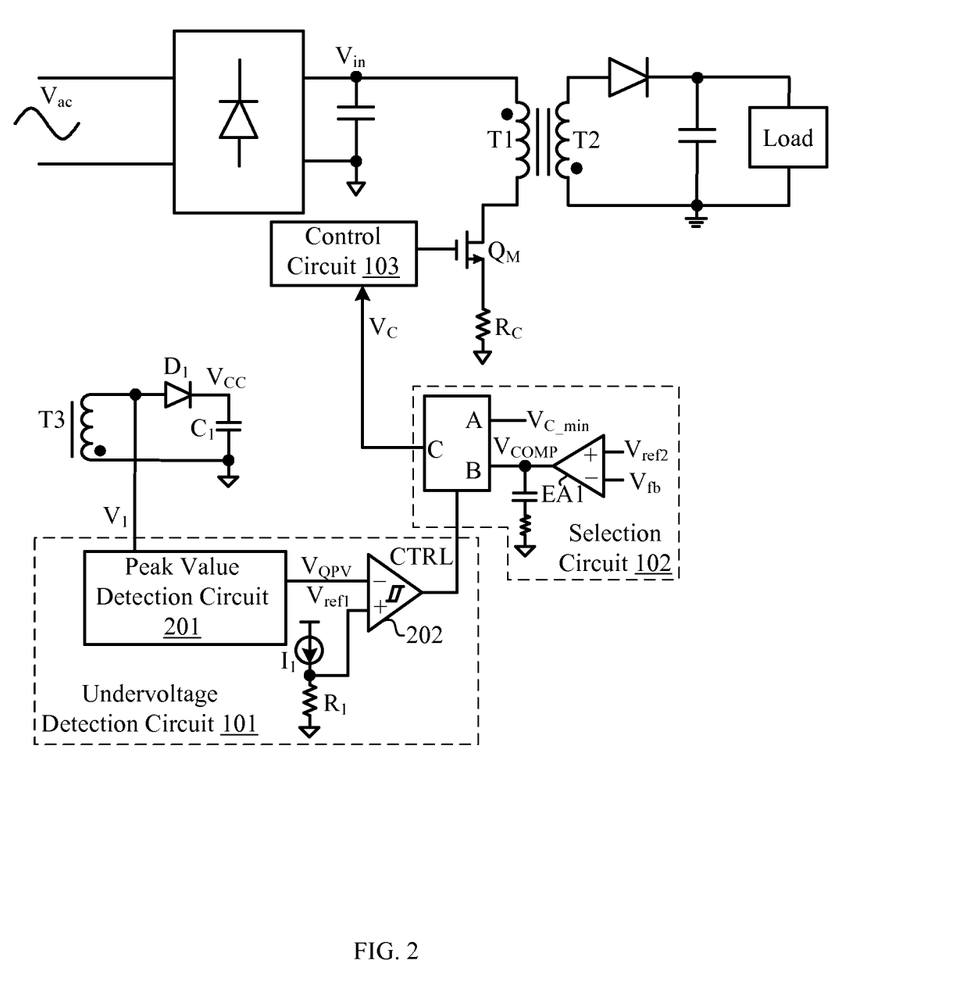
FIG. 2 is a schematic block diagram of an example undervoltage protection circuit in accordance with embodiments of the present invention.

The undervoltage protection circuit can include undervoltage detection circuit 101, selection circuit 102, and control circuit 103. Undervoltage detection circuit 101 can receive voltage $V_1$ that represents input voltage $V_{in}$ of the switching power supply. For example, undervoltage detection circuit 101 can detect whether the input voltage is in an undervoltage state by comparing a peak signal of voltage $V_1$ against a reference voltage (e.g., $V_{ref1}$, as shown in FIG. 2) to generate detection result CTRL. The reference voltage for this comparison can be generated in undervoltage detection circuit 101, or may be supplied by another circuit or component.

Selection circuit 102 can connect with undervoltage detection circuit 101, and may select (e.g., based on detection result CTRL) either control signal $V_{COMP}$ or control signal $V_{C\_min}$ to be used as main control signal $V_C$, and provided to control circuit 103. Thus, detection result CTRL can provide selection control to choose a particular control signal for designation as "main" control signal $V_C$ for control circuit 103. For example, control signal $V_{COMP}$ can include an output voltage error feedback signal of the switching power supply, and control signal $V_{C\_min}$ may be no greater than (e.g., less in absolute value than) control signal $V_{COMP}$. In one example, control signal $V_{C\_min}$ may represent a minimum value of control signal $V_{COMP}$. However, control signal $V_{C\_min}$ may alternatively be set to other predetermined values.

Control circuit 103 can receive control signal $V_C$ provided by selection circuit 102. When main control signal $V_C$ is control signal $V_{COMP}$, control circuit 103 can control the switching operation of a power transistor (e.g., $Q_M$) in the switching power supply such that the output voltage (e.g., at the load) of the switching power supply maintained as substantially stable. This represents a normal operation of the switching power supply, such as when there is no undervoltage condition detected. However, when main control signal $V_C$ is control signal $V_{C\_min}$, control circuit 103 can control the switching operation of power transistor $Q_M$ to reduce the input power of the switching power supply. This represents an abnormal (e.g., undervoltage) condition of the switching power supply, and thus input power may be reduced as a protective measure.

In particular embodiments, an undervoltage protection circuit can detect whether the input voltage of the switching power supply is in an undervoltage state via undervoltage detection circuit 101. If the input voltage is in a non-undervoltage state, the power stage circuit can be controlled (e.g., via control circuit 103) to operate in a normal fashion. However, if the input voltage is in an undervoltage state, the input power of the power stage circuit can be reduced so as to achieve undervoltage protection. As will be discussed in more detail below, particular embodiments can accommodate several approaches to reducing the input power of the power stage circuit.

Referring now to FIG. 2, shown is a schematic block diagram of an example undervoltage protection circuit in accordance with embodiments of the present invention. In this example, undervoltage detection circuit 101 can include peak value detection circuit 201 and a comparison circuit (e.g., hysteresis comparator 202). Peak value detection circuit 201 can receive voltage $V_1$ that represents the input voltage of the switching power supply, and may generate peak voltage signal $V_{QPV}$ that represents peak information about the input voltage. Also, any suitable implementation of peak value detection circuit 201 (see, e.g., Chinese Patent Application No. 201310076683.4) can be supported in particular embodiments.

Furthermore, hysteresis comparator 202 can receive peak voltage signal $V_{QPV}$ and reference voltage $V_{ref1}$, and may generate a comparison output signal as detection result CTRL. For example, reference voltage $V_{ref1}$ can be obtained by generating a voltage drop on resistor $R_1$ via current source $I_1$. Specifically, when peak voltage signal $V_{QPV}$ is less than reference voltage $V_{ref1}$, the input voltage of the switching power supply can be detected as being in an undervoltage state, and the comparison signal or detection result CTRL can be high. When peak voltage signal $V_{QPV}$ is greater than reference voltage $V_{ref1}$, indicating that the input voltage of the switching power supply is in a non-undervoltage or normal operating state, the comparison signal or detection result CTRL can be low.

When detection result CTRL is high, selection circuit 102 can select control signal $V_{C\_min}$ as main control signal $V_C$ to be provided to control circuit 103. When detection result CTRL is low, selection circuit 102 can select output voltage error feedback signal $V_{COMP}$ as main control signal $V_C$ to be provided to control circuit 103. Here, output voltage error feedback signal $V_{COMP}$ can be obtained by comparing output voltage feedback voltage $V_{fb}$ against reference voltage $V_{ref2}$, and by compensating the error amplifier signal via an RC circuit. For example, control signal $V_{C\_min}$ may be no greater than (e.g., less in absolute value than) output voltage error feedback signal $V_{COMP}$. In one particular example, control signal $V_{C\_min}$ can be a minimum value of output voltage error feedback signal $V_{COMP}$.

Figure 3A:
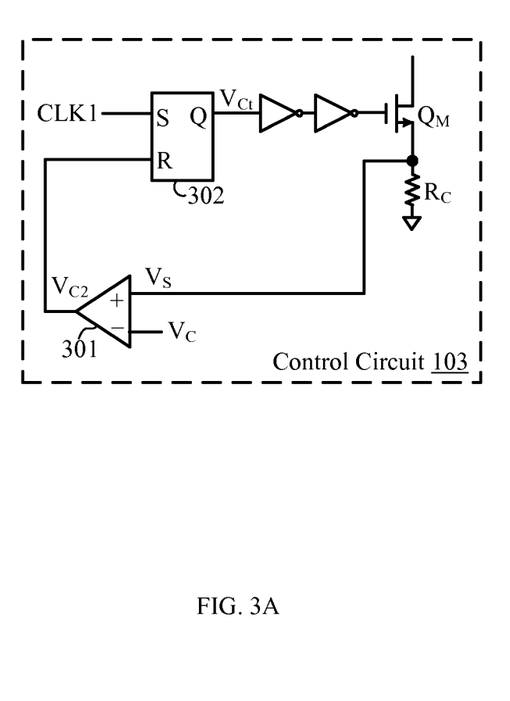
FIG. 3A is a schematic block diagram of a first example control circuit in the undervoltage protection circuit shown in FIG. 2, in accordance with embodiments of the present invention.

Referring now to FIG. 3A, shown is a schematic block diagram of a first example control circuit in the undervoltage protection circuit shown in FIG. 2, in accordance with embodiments of the present invention. In this particular example, control circuit 103 can include a comparison circuit (e.g., comparator 301) and a logic circuit (e.g., RS flip-flop 302). A first input of comparator 301 can receive main control signal $V_C$ from selection circuit 102, and a second input of comparator 301 can receive sense voltage signal $V_S$ that represents an input current of the switching power supply.

Comparator 301 may provide comparison signal $V_{C2}$ to reset terminal R of RS flip-flop 302. Also, set terminal S of RS flip-flop 302 can receive clock signal CLK1, and may generate logic control signal $V_{Ct}$ for controlling the switching operation of power transistor $Q_M$. For example, logic control signal $V_{Ct}$ can be processed (e.g., buffered) by two inverters to enhance its driving ability for controlling the switching operation of power transistor $Q_M$.

Referring also to FIG. 2, when peak voltage signal $V_{QPV}$ is less than reference voltage $V_{ref1}$, detection result CTRL can be high to indicate that the input voltage of the switching power supply is in an undervoltage state. In this case, selection circuit 102 can select control signal $V_{C\_min}$ as main control signal $V_C$ to be provided to control circuit 103. As shown in FIG. 3A, the inverting input of comparator 301 in control circuit 103 can receive main control signal $V_C$, and the non-inverting input can receive sense voltage signal $V_S$. When sense voltage signal $V_S$ is higher than main control signal $V_C$, comparison signal $V_{C2}$ output from comparator 301 can go high. Because comparison signal $V_{C2}$ is supplied to the reset terminal of RS flip-flop 302, logic control signal $V_{Ct}$ can go low to turn off power transistor $Q_M$. Thus in this case, the input current and thus the input power of the switching power supply can be reduced to address the undervoltage state.

When peak voltage signal $V_{QPV}$ is greater than reference voltage $V_{ref1}$, detection result CTRL can be low to indicate that the input voltage of the switching power supply is in a non-undervoltage state. In this case, selection circuit 102 can select output voltage error feedback signal $V_{COMP}$ as main control signal $V_C$ to be provided to control circuit 103. As a result, control circuit 103 can control the output voltage of the switching power supply to be maintained as substantially stable according to output voltage error feedback signal $V_{COMP}$. Thus, the switching power supply can operate in a normal fashion when a non-undervoltage state is detected.

In this fashion, an undervoltage protection circuit can determine whether the input voltage of a switching power supply is in an undervoltage state by comparing a peak voltage signal (e.g., $V_{QPV}$) that indicates an input voltage peak against a reference voltage (e.g., $V_{ref1}$). As compared to other approaches, product circuit area/volume and cost can be reduced by avoiding a relatively large voltage dividing resistor loop. Also, when the input voltage is determined to be in the undervoltage state, the undervoltage protection circuit can reduce the input power by reducing the input current. In this way, the power device (e.g., power transistor $Q_M$) in the switching power supply can be protected from being damaged due to this undervoltage condition.

Figure 3B:
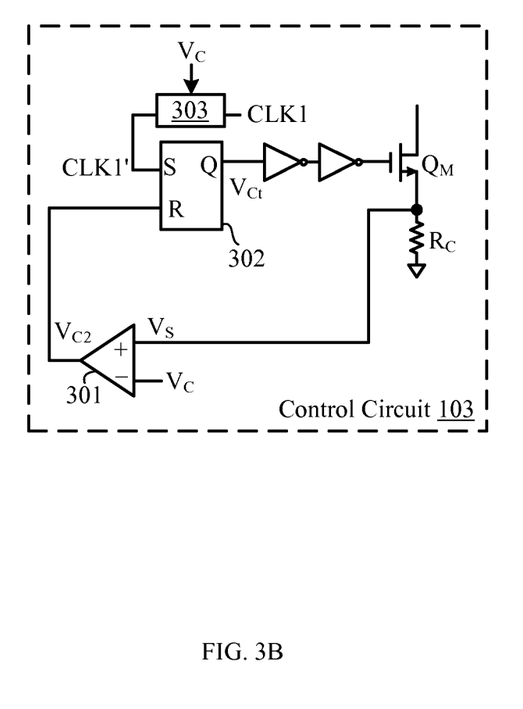
FIG. 3B is a schematic block diagram of a second example control circuit in the undervoltage protection circuit shown in FIG. 2, in accordance with embodiments of the present invention.

Referring now to FIG. 3B, shown is a schematic block diagram of a second example control circuit in the undervoltage protection circuit shown in FIG. 2, in accordance with embodiments of the present invention. In this particular example, clock signal regulating circuit 303 can be included. Clock signal regulating circuit 303 can receive main control signal $V_C$ and clock signal CLK1. For example, clock signal regulating circuit 303 can regulate a frequency of clock signal CLK1 according to main control signal $V_C$. In this case, the regulated clock signal can be denoted as CLK1', and regulated clock signal CLK1' can be provided to the set terminal of RS flip-flop 302, as shown.

When the input voltage is detected as in the undervoltage state, selection circuit 102 can select control signal $V_{C\_min}$ as main control signal $V_C$ to be provided to control circuit 103. Control circuit 103 can reduce the input current of the switching power supply according to control signal $V_{C\_min}$. Also, clock signal regulating circuit 303 can receive main control signal $V_C$, and may accordingly reduce the frequency of clock signal CLK1 when control signal $V_{C\_min}$ is selected as main control signal $V_C$. This lowered frequency of the power transistor when the input voltage is in the undervoltage state can reduce the input power of the switching power supply, in order to realize undervoltage protection.

Figure 3C:
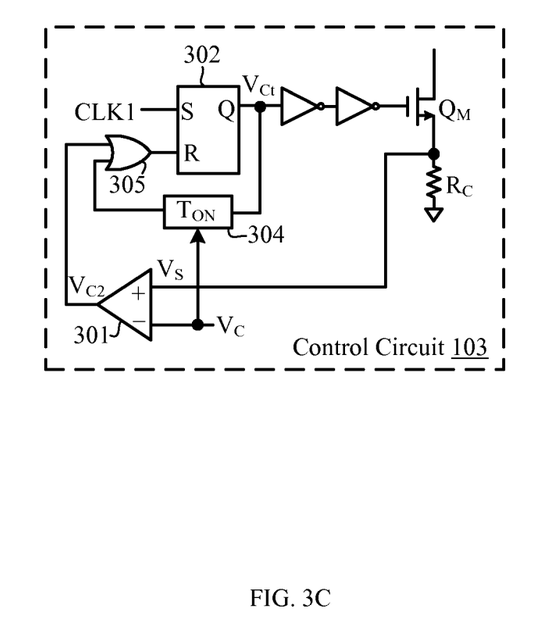
FIG. 3C is a schematic block diagram of a third example control circuit in the undervoltage protection circuit shown in FIG. 2, in accordance with embodiments of the present invention.

Referring now to FIG. 3C, shown is a schematic block diagram of a third example control circuit in the undervoltage protection circuit shown in FIG. 2, in accordance with embodiments of the present invention. In this particular example, timing circuit 304 and OR-gate 305 can be added. One input of timing circuit 304 can receive main control signal $V_C$, and the other input of timing circuit 304 can receive logic control signal $V_{Ct}$. An output from timing circuit 304 can be provided as an input to OR-gate 305. OR-gate 305 can also receive comparison signal $V_{C2}$, and may provide an output to the reset terminal of RS flip-flop 302. For example, timing circuit 304 can regulate the on time of power transistor $Q_M$ according to main control signal $V_C$ and logic control signal $V_{Ct}$.

When the input voltage is detected as being in the undervoltage state, selection circuit 102 can select control signal $V_{C\_min}$ as main control signal $V_C$ to be provided to control circuit 103. In this case, control circuit 103 can reduce the input current of the switching power supply according to control signal $V_{C\_min}$. Furthermore, timing circuit 304 can receive main control signal $V_C$ and logic control signal $V_{Ct}$, and may accordingly regulate the on time of power transistor $Q_M$. For example, the on time ($T_{ON}$) of power transistor $Q_M$ can be regulated to reduce the input power of the power stage circuit to address the undervoltage condition, thus realizing undervoltage protection.

In this fashion, when the input voltage of the switching power supply is in the undervoltage state, the undervoltage protection circuit of particular embodiments can thus employ different protection methods. For example, the input current of the switching power supply can be reduced (e.g., via the control circuit of FIG. 3A), the operating frequency of the power transistor reduced (e.g., via the control circuit of FIG. 3B), and/or the on time of the power transistor can be reduced (e.g., via the control circuit of FIG. 3C). In any event, the input power of the power stage circuit in the switching power supply can be reduced so as to protect a power device (e.g., transistor $Q_M$) in the switching power supply from being damaged due to the undervoltage condition.

Figure 4:
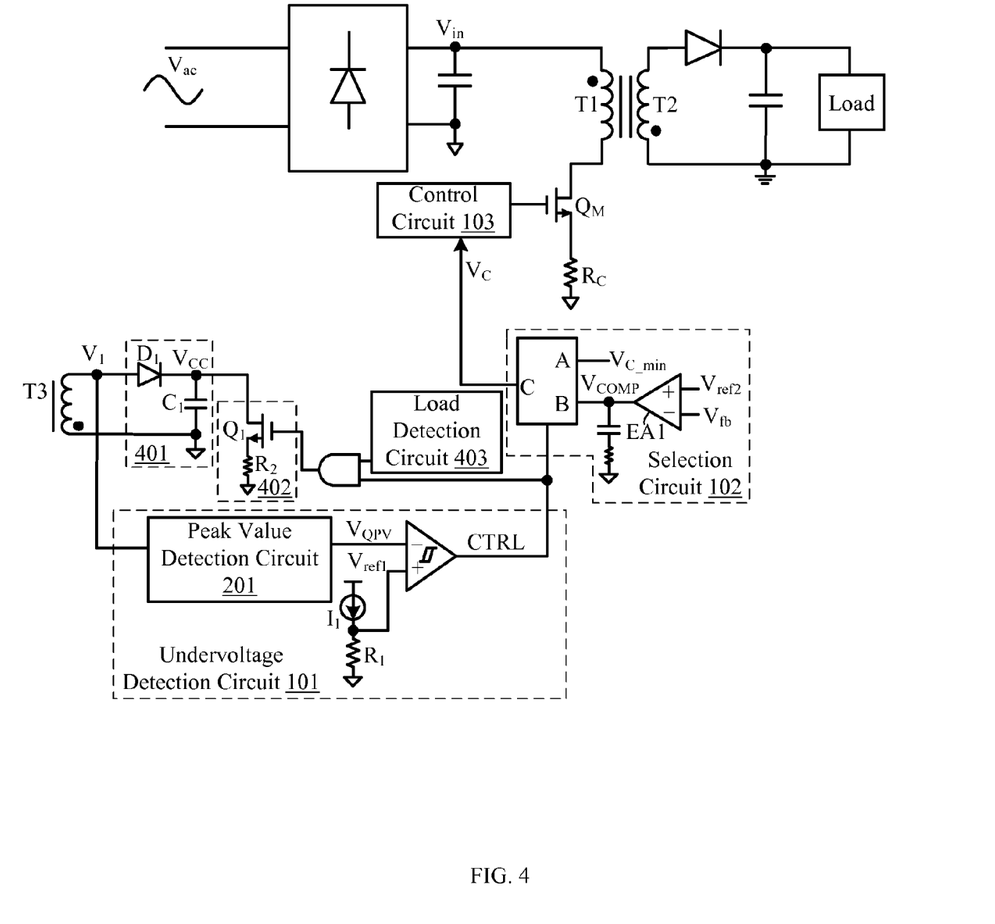
FIG. 4 is a schematic block diagram of a second example undervoltage protection circuit in accordance with embodiments of the present invention.

Referring now to FIG. 4, shown is a schematic block diagram of a second example undervoltage protection circuit in accordance with embodiments of the present invention. In this particular example, the undervoltage protection circuit can include auxiliary voltage circuit 401, discharging circuit 402, and load detection circuit 403. Here, auxiliary voltage circuit 401 can receive voltage $V_1$ that represents the input voltage of the switching power supply, and may generate power supply voltage $V_{CC}$. For example, power supply voltage $V_{CC}$ can be configured to supply voltage for the control chip (e.g., including control circuit 103) of the switching power supply. Load detection circuit 403 can be configured to detect a load state (e.g., an unloaded state, a loaded state, a light load, a heavy load, etc.) of the switching power supply.

Discharging circuit 402 can receive detection result CTRL and power supply voltage $V_{CC}$, and may determine whether to discharge power supply voltage $V_{CC}$ according to detection result CTRL and the load state. Discharging circuit 402 can include transistor $Q_1$ and resistor $R_2$. A first power terminal of transistor $Q_1$ can receive power supply voltage $V_{CC}$, a second power terminal of transistor $Q_1$ can be grounded via series-connected resistor $R_2$, and a control terminal of transistor $Q_1$ can receive (e.g., via an AND-gate) detection result CTRL. For example, when detection result CTRL is high, and load detection circuit 403 detects that the load is unloaded, transistor $Q_1$ can be turned on, and power supply voltage $V_{CC}$ can be discharged through resistor $R_2$ so that the control chip (e.g., control circuit 103) may be disabled to reduce the associated power losses.

In one embodiment, a method of controlling undervoltage protection in a switching power supply, can include: (i) generating a detection result by detecting whether an input voltage of the switching power supply is in an undervoltage state; (ii) selecting, based on the detection result, a first or a second control signal as a main control signal for a control circuit, where the first control signal comprises an output voltage error feedback signal of the switching power supply, and the second control signal is less than the first control signal; (iii) controlling, in response to the main control signal being the first control signal, a switching operation of a power transistor in the switching power supply such that an output voltage of the switching power supply is maintained as substantially stable; and (iv) controlling, in response to the main control signal being the second control signal, the switching operation of the power transistor to reduce an input power of the switching power supply.

Figure 5:
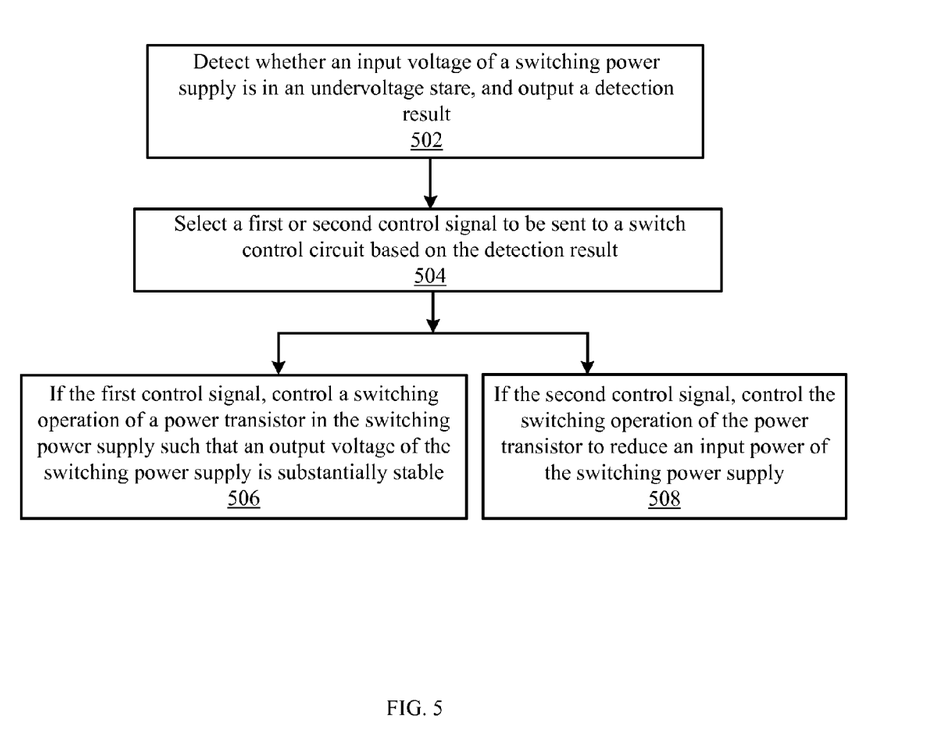
FIG. 5 is a flow diagram of an example method of undervoltage protection, in accordance with embodiments of the present invention.

Referring now to FIG. 5, shown is a flow diagram of an example method of undervoltage protection, in accordance with embodiments of the present invention. At 502, whether an input voltage of a switching power supply is in an undervoltage state can be detected (e.g., via undervoltage detection circuit 101), and a detection result (e.g., CTRL) can be accordingly output. At 504, a first or second control signal can be selected (e.g., via selection circuit 102) to be provided as a main control signal to a control circuit (e.g., 103) according to the detection result. For example, the first control signal can include an output voltage error feedback signal (e.g., $V_{COMP}$) of the switching power supply, and the second control signal (e.g., $V_{C\_min}$) can be no greater than (e.g., a minimum of) the first control signal.

At 506, when the main control signal is the first control signal, the switching operation of a power transistor (e.g., $Q_M$) in the switching power supply can be controlled such that an output voltage of the switching power supply is maintained as substantially stable. This represents the normal operation of the switching power supply. At 508, when the main control signal is the second control signal, the switching operation of the power transistor can be controlled to reduce the input power of the switching power supply. This represents undervoltage protection operation of the switching power supply. Also, as discussed above, various approaches to lowering the input power (e.g., lowering input current, reducing operating frequency, reducing transistor on time) can be supported in particular embodiments.

The example method can also include receiving a voltage (e.g., $V_1$) that represents the input voltage (e.g., $V_{in}$) of the power supply voltage, and generating a power supply voltage (e.g., $V_{CC}$). The load state of the switching power supply can also be detected, and a determination as to whether to discharge (e.g., via transistor $Q_1$ and resistor $R_2$) the power supply voltage can be made according to the detection result and the load state.

Particular embodiments can also include a switching power supply, which can include a power stage circuit and an undervoltage protection circuit, as described herein. The power stage circuit can be any appropriate converter topology structure (e.g., flyback, forward, boost, buck, SEPIC, ZETA, etc.). Similarly, the switching power supply, by use of the above-described undervoltage protection circuitry, can protect one or more power transistors therein from being damaged as a result of an undervoltage condition.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. An undervoltage protection circuit configured for a switching power supply, said undervoltage protection circuit comprising:
    a) an undervoltage detection circuit configured to use a first voltage that represents an input voltage of said switching power supply to determine whether said input voltage is in an undervoltage state, and to output a detection result;
    b) a selection circuit configured to select a first or a second control signal to be provided as a main control signal to a control circuit based on said detection result, wherein said first control signal comprises an output voltage error feedback signal of said switching power supply, and said second control signal represents a minimum value of said first control signal;
    c) said control circuit being configured, in response to said main control signal being said first control signal, to control a switching operation of a power transistor in said switching power supply such that an output voltage of said switching power supply is maintained as substantially stable; and
    d) said control circuit being configured, in response to said main control signal being said second control signal, to control said switching operation of said power transistor to reduce an input power of said switching power supply.

2. The undervoltage protection circuit of claim 1, wherein said undervoltage detection circuit comprises:
    a) a peak value detection circuit configured to receive said first voltage, and to generates a peak voltage signal that represents peak information of said input voltage; and
    b) a comparison circuit configured to receive said peak voltage signal and a first reference voltage, and to generate a first comparison signal as said detection result, wherein said first comparison signal is high when said peak voltage signal is less than said first reference voltage to indicate that said input voltage is in an undervoltage state, and wherein said first comparison signal is low when said peak voltage signal is greater than said first reference voltage to indicate that said input voltage is in a non-undervoltage state.

3. The undervoltage protection circuit of claim 2, wherein said selection circuit is configured to:

a) select said first control signal as said main control signal when said first comparison signal is low; and
b) select said second control signal as said main control signal when said first comparison signal is high.

4. The undervoltage protection circuit of claim 1, wherein said control circuit comprises:
   a) a second comparison circuit configured to receive said main control signal and a sense voltage signal that represents an input current of said switching power supply, and to generate a second comparison signal; and
   b) a logic circuit configured to receive said second comparison signal and a first clock signal, and to generate a logic control signal to control said switching operation of said power transistor.

5. The undervoltage protection circuit of claim 4, wherein said control circuit further comprises a clock signal regulating circuit configured to regulate a frequency of said first clock signal based on said main control signal.

6. The undervoltage protection circuit of claim 4, wherein said control circuit further comprises:
   a) a first timing circuit configured to regulate an on time of said power transistor based on said main control signal and said logic control signal; and
   b) a first OR gate configured to receive an output from said first timing circuit and said second comparison signal, and to provide an output signal to said logic circuit.

7. The undervoltage protection circuit of claim 1, wherein said undervoltage protection circuit further comprises:
   a) an auxiliary power supply circuit comprising an auxiliary winding coupled with an input inductor of said switching power supply, being configured to receive said first voltage, and to generate a power supply voltage;
   b) a load detection circuit configured to detect a load state of said switching power supply; and
   c) a discharging circuit configured to receive said detection result and said power supply voltage, and to determine whether to discharge said power supply voltage according to said detection result and said load state.

8. A switching power supply, comprising:
   a) a power stage circuit; and
   b) said undervoltage protection circuit of claims 1.

9. The undervoltage protection circuit of claim 1, wherein said first voltage is at a common node of an auxiliary winding and an anode of a diode.

10. A method of controlling undervoltage protection in a switching power supply, the method comprising:
    a) generating a detection result by detecting whether an input voltage of said switching power supply is in an undervoltage state;
    b) selecting, based on said detection result, a first or a second control signal as a main control signal for a control circuit, wherein said first control signal comprises an output voltage error feedback signal of said switching power supply, and said second control signal represents a minimum value of said first control signal;
    c) controlling, in response to said main control signal being said first control signal, a switching operation of a power transistor in said switching power supply such that an output voltage of said switching power supply is maintained as substantially stable; and
    d) controlling, in response to said main control signal being said second control signal, said switching operation of said power transistor to reduce an input power of said switching power supply.

11. The method of claim 10, further comprising:
    a) generating a power supply voltage from said first voltage;
    b) detecting a load state of said switching power supply; and
    c) determining whether to discharge said power supply voltage based on said detection result and said load state.

* * * * *